(12) United States Patent
Nakano et al.

(10) Patent No.: US 10,668,585 B2
(45) Date of Patent: Jun. 2, 2020

(54) SEAT FRAME ASSEMBLING UNIT AND MANUFACTURING METHOD FOR SEAT FRAME

(71) Applicant: TS TECH CO., LTD., Asaka-shi, Saitama (JP)

(72) Inventors: Masashi Nakano, Tochigi (JP); Shingo Kaneko, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 186 days.

(21) Appl. No.: 15/472,397

(22) Filed: Mar. 29, 2017

(65) Prior Publication Data

US 2017/0282313 A1    Oct. 5, 2017

(30) Foreign Application Priority Data

Mar. 31, 2016  (JP) ................................. 2016-072939

(51) Int. Cl.
*B23P 21/00* (2006.01)
*B25J 9/00* (2006.01)
*B25J 15/06* (2006.01)
*B60N 2/68* (2006.01)

(52) U.S. Cl.
CPC .......... *B23P 21/002* (2013.01); *B25J 9/0096* (2013.01); *B25J 15/0608* (2013.01); *B60N 2/682* (2013.01)

(58) Field of Classification Search
CPC .... B60N 2/68; B60N 2/682; B60N 2002/684; B25J 9/0096; B25J 15/0608; B23P 21/002
See application file for complete search history.

(56) References Cited

U.S. PATENT DOCUMENTS

| 2003/0005594 | A1* | 1/2003 | Recupero | .............. B23P 21/002 33/549 |
| 2009/0249606 | A1* | 10/2009 | Diez | ....................... B23K 11/11 29/428 |
| 2010/0287767 | A1* | 11/2010 | Woo | ...................... B23P 21/004 29/823 |
| 2016/0052148 | A1* | 2/2016 | Shi | ....................... B25J 15/0608 29/559 |

FOREIGN PATENT DOCUMENTS

JP          07-187036 A        7/1995

* cited by examiner

*Primary Examiner* — Christopher M Koehler
(74) *Attorney, Agent, or Firm* — Faegre Drinker Biddle & Reath LLP

(57) ABSTRACT

A seat frame assembling unit includes: a setting device and a setting robot. The setting device is driven in a state where side frames, a connecting frame, a pan frame, a member frame and an upper frame are arranged. The setting robot installs the side frames side by side and subsequently installs the connecting frame, the pan frame, the member frame and the upper frame between the side frames. The setting device moves the side frames to positions in which the side frames are to be assembled with the connecting frame, the pan frame, the member frame and the upper frame.

6 Claims, 8 Drawing Sheets

SEAT FRAME ASSEMBLING UNIT AND MANUFACTURING METHOD FOR SEAT FRAME

CROSS REFERENCE TO RELATED APPLICATIONS

This application is based upon and claims the priority benefit of Japanese Patent Application No. 2016-072939, filed Mar. 31, 2016, the contents being incorporated herein by reference.

BACKGROUND

The present disclosure relates to a seat frame assembling unit and a manufacturing method for a seat frame and particularly pertains to a seat frame assembling unit and a manufacturing method for a seat frame that can increase manufacturing efficiency of the seat frame.

Industrial robots are typically used, for example, for manufacturing products, as a means to reduce manufacturing costs. For example, Japanese Unexamined Patent Application Publication No. 07-187036 (JP07-187036A) describes a configuration in which a vehicle seat is loaded into a vehicle by a robot to be assembled on a vehicle body floor. In addition to the usage of a robot for assembling a vehicle seat on a floor of a vehicle, a robot is used to assemble components of the vehicle seat and thereby manufacturing efficiency may be increased.

However, if a vehicle seat is configured with a plurality of components having different shapes, some robots may have difficulty effectively assembling the components. For example, robots for installing components or components themselves are brought into contact with another component; therefore, the other component installed may be displaced or components may not follow predetermined conveyor pathways. Also, for example, a portion of a component to be held by a robot varies. In such a case, when the same components are conveyed in the same conveyor pathway, the components may not be stably installed in place. Accordingly, in order that the components are held via the same portion by the robot, the components need to be aligned before being held by the robot; therefore, manufacturing efficiency may be decreased.

Furthermore, if a plurality of components is installed in a state where the installation position displacement has occurred as described above, welding is successively performed between the plurality of components; therefore, dimensional precision of welded portions may be deteriorated. Also, for example, a setting robot including a plurality of kinds of holding portions is used to hold components having different shapes. In such a case, the holding portions need to be changed in accordance with the shapes of the components; therefore, manufacturing efficiency may be decreased.

SUMMARY

The present disclosure has been made in view of the aforementioned problems, and an embodiment of the present disclosure provides a seat frame assembling unit and a manufacturing method for a seat frame that can increase manufacturing efficiency of a seat frame for a vehicle seat, which is configured with a cushion frame or a back frame. Another embodiment of the present disclosure improves dimensional precision of welding between components of the seat frame. Still another embodiment of the present disclosure allows a plurality of components to be held by the same holding portion of a second device. A further embodiment of the present disclosure allows a plurality of kinds of components to be held by the same holding portion of the second device.

At least some of the aforementioned problems may be solved by a seat frame assembling unit according to various embodiments of the present disclosure. The seat frame assembling unit includes: a first device configured to be driven in a state where outer frame components of a vehicle seat to be located at an outer side in a seat width direction of the vehicle seat and inner frame components to be located at an inner side in the seat width direction are arranged, the outer frame components and the inner frame components being components of at least one of a cushion frame and a back frame that form the vehicle seat; and a second device operable to install the outer frame components and the inner frame components on the first device, wherein the second device is operable to install the outer frame components side by side and is subsequently operable to install the inner frame components between the outer frame components, and wherein in a state where the outer frame components and the inner frame components are arranged, the first device is driven to move the outer frame components to positions in which the outer frame components are to be assembled with the inner frame components.

According to the foregoing configuration, the outer frame components are installed side by side by the second device and thereafter the inner frame components are installed between the outer frame components by the second device. Accordingly, at the time of conveyance of the inner frame components, the inner frame components are easily inhibited from following pathways overlapped with the outer frame components. Therefore, the components may be inhibited from interfering with one another. Also, even if a pipe, a rod, and the like as the inner frame components are installed between the outer frame components on the first device by the second device in such a manner as to be displaced in the right to left direction, the inner frame components are pushed by the outer frame components moved by the first device and thus the arrangement of the inner frame components is adjusted. Consequently, the seat frame may be effectively assembled.

According to another embodiment of the present disclosure, the seat frame assembling unit may include a welding device configured to perform welding on the cushion frame or the back frame, and the welding device may perform welding between the outer frame components moved by the first device and the inner frame components. According to the foregoing configuration, welding can be performed on the cushion frame and the back frame in one step. Therefore, welding distortion can be suppressed and dimensional precision can be increased.

According to still another embodiment of the present disclosure, the second device may include a holding portion for holding the outer frame components and the inner frame components, and the holding portion may include a plurality of surfaces on which the outer frame components and the inner frame components are to be held. According to the foregoing configuration, a holding surface of the second device on which components are to be held is changed in accordance with the shapes of the components; thereby, the components can be held by the same holding portion.

According to a further embodiment of the present disclosure, the second device may include holding portions for holding a plurality of components of the outer frame components and the inner frame components. According to the foregoing configuration, the second device including a plurality of holding portions is used; thereby, a plurality of components can be held at one time.

According to another embodiment of the present disclosure, the holding portion may include a portion for holding different kinds of components including the outer frame components and the inner frame components. According to the foregoing configuration, the holding portion can hold different kinds of components.

Also, the aforementioned problems may be solved by a manufacturing method for a seat frame according to another embodiment of the present disclosure, for assembling a cushion frame or a back frame by a first device and a second device to manufacture the cushion frame or the back frame. The first device is configured to be driven in a state where outer frame components of a vehicle seat to be located at an outer side in a seat width direction of the vehicle seat and inner frame components to be located at an inner side in the seat width direction are arranged, the outer frame components and the inner frame components being components of at least one of a cushion frame and a back frame that form the vehicle seat. The second device is operable to install the outer frame components and the inner frame components on the first device. The method includes: installing, by the second device, the outer frame components side by side and subsequently installing the inner frame components between the outer frame components; and moving, in a state where the outer frame components and the inner frame components are arranged, by the first device, the outer frame components to positions in which the outer frame components are to be assembled with the inner frame components.

According to the foregoing configuration, the outer frame components are installed side by side by the second device and thereafter the inner frame components are installed between the outer frame components by the second device. Accordingly, during conveyance of the inner frame components, the inner frame components are easily inhibited from following pathways overlapped with the outer frame components. Therefore, the components may be inhibited from interfering with one another. Also, even if a pipe, a rod, and the like as the inner frame components are installed between the outer frame components on the first device by the second device in such a manner as to be dislocated in the right to left direction, the inner frame components are pushed by the outer frame components moved by the first device and thus the arrangement of the inner frame components is adjusted. Consequently, the seat frame may be effectively assembled.

According to an embodiment of the present disclosure, the seat frame can be effectively assembled. According to another embodiment of the present disclosure, dimensional precision of welded portions can be increased. According to still another embodiment of the present disclosure, components can be held by the same holding portion. According to a further embodiment of the present disclosure, a plurality of components can be held by the same holding portion. According to a still further embodiment of the present disclosure, different kinds of components can be held by the same holding portion.

BRIEF DESCRIPTION OF THE DRAWINGS

Various embodiments of the invention are illustrated I the drawings, in which.

DETAILED DESCRIPTION

The present disclosure relates to a seat frame assembling unit and a manufacturing method for a seat frame and particularly pertains to a seat frame assembling unit and a manufacturing method for a seat frame that can increase manufacturing efficiency of the seat frame. A seat frame assembling unit U according to an embodiment of the present disclosure is described below. The embodiment to be described below is merely an example for facilitating understanding of the present disclosure and does not restrict the invention. In other words, it is understood that shapes, dimensions, arrangements, or the like of members to be described below may be changed or modified without departing from the scope of the invention and that the invention may include its equivalents. Also, in the descriptions below, a seat width direction based on a seat frame (vehicle seat) indicates a direction corresponding to a right to left direction or an inner to outer direction in a state before the seat frame is completed. A front to back direction that is a direction perpendicular to the seat width direction indicates a direction corresponding to a front to back direction of the seat frame.

Configuration of Seat Frame 1

Figure 1:
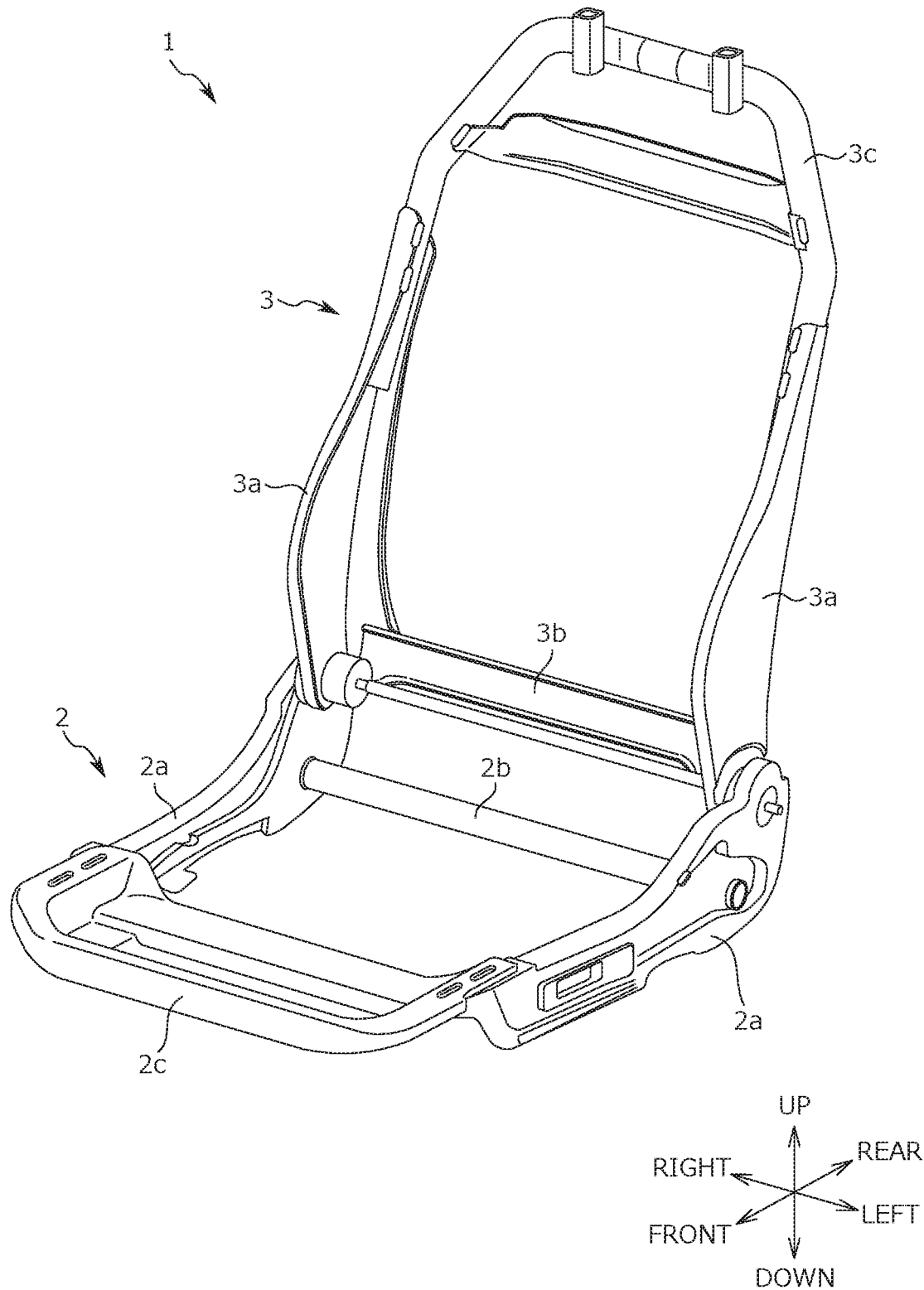
FIG. 1 is a perspective view of a seat frame according to an embodiment of the present disclosure.

The configuration of a seat frame 1 to be assembled by the seat frame assembling unit U according to the present embodiment will first be described with reference to FIG. 1. FIG. 1 is a perspective view of the seat frame 1 according to an embodiment of the present disclosure. The seat frame 1 mainly includes, as components thereof, a cushion frame 2 serving as a frame of a seat cushion (not shown) and a back frame 3 serving as a frame of a seat back (not shown).

The cushion frame 2 includes, as components thereof, right and left side frames 2a, a connecting frame 2b, and a pan frame 2c. The side frames 2a serving as outer frame components are arranged on the right and left in the seat width direction. The connecting frame 2b serves as an inner frame component, and opposite end portions of the connecting frame 2b are connected on the respective rear sides of the right and left side frames 2a in the seat front to back direction. The pan frame 2c serves as an inner frame component, and opposite end portions of the pan frame 2c in the seat width direction are connected on the respective front sides of the right and left side frames 2a in the seat front to back direction. The back frame 3 includes, as components thereof, right and left side frames 3a, a member frame 3b, and an upper frame 3c. The side frames 3a serving as outer frame components are arranged on the right and left in the seat width direction. The member frame 3b serves as an inner frame component, and opposite end portions of the member frame 3b are connected on the respective lower sides of the right and left side frames 3a. The upper frame 3c serves as an inner frame component, and opposite end portions of the upper frame 3c are connected on the respective upper sides of the right and left side frames 3a.

Configuration of Seat Frame Assembling Unit U

Figure 2:
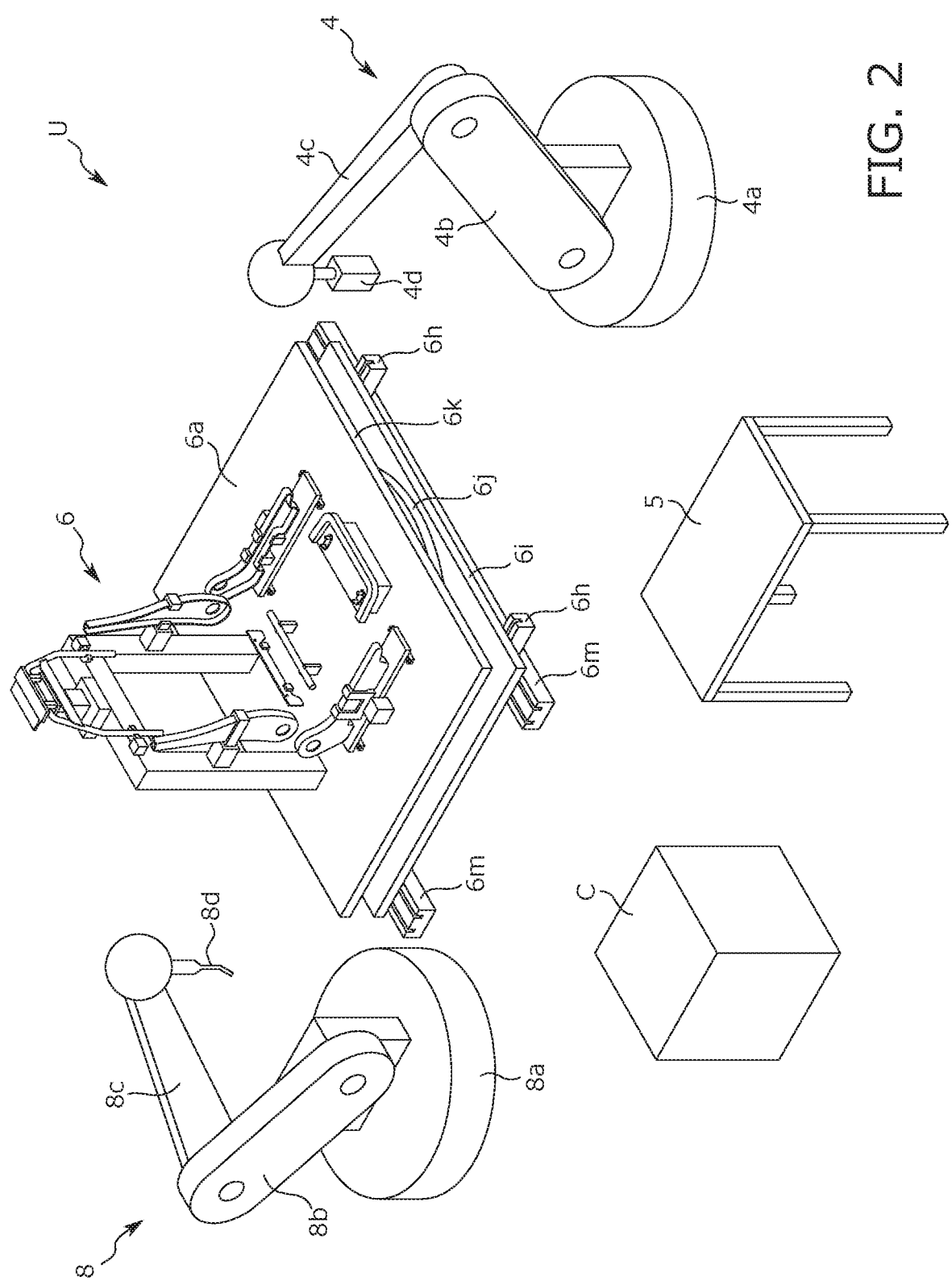
FIG. 2 is a schematic perspective view showing a seat frame assembling unit.

Next, the main configuration of the seat frame assembling unit U is described with reference to FIG. 2. FIG. 2 is a schematic perspective view showing the seat frame assembling unit U. The seat frame assembling unit U mainly includes a setting robot 4, a setting device 6, a welding robot 8, and a controller C for controlling the setting robot 4, the setting device 6 serving as a first device, and the welding robot 8. The setting robot 4 serving as a second device is configured to hold and convey the components of the seat frame 1 and install the components on the setting device 6. The components of the seat frame 1 are to be installed on the setting device 6. The welding robot 8 serving as a welding device is configured to performing welding on the seat frame 1.

Specifically, the setting robot 4 functions to hold and convey the components such as the side frames 2a, the connecting frame 2b, and the side frames 3a that are provided on a component stand 5 and install the components on the setting device 6. The setting robot 4 includes a rotating table 4a rotatable in a horizontal plane, and an arm having a lower rotating portion 4b, and an upper rotating portion 4c. A base end of the lower rotating portion 4b is attached to an upper portion of the rotating table 4a in such a manner as to be rotatable in a vertical plane. A base end of the upper rotating portion 4c is attached to an upper portion of the lower rotating portion 4b in such a manner as to be rotatable in a vertical plane.

A holding portion 4d with a generally cuboid shape is attached to a distal end of the upper rotating portion 4c. An electric magnet is embedded in the holding portion 4d. The setting robot 4 is configured so that the metallic components of the seat frame 1, which have magnetic properties, are held on five surfaces of four lateral surfaces and a distal-end surface of the holding portion 4d (that is, by a plurality of holding portions) by a magnetic force of the holding portion 4d. As just described, the setting robot 4 includes the holding portion 4d made of a high-magnetic material such as an electric magnet, thereby allowing the setting robot 4 to hold a plurality of components and a plurality of kinds of components.

The holding portion 4d includes the four lateral surfaces but may include three lateral surfaces in other embodiments. Alternatively, the holding portion 4d may include a plurality of lateral surfaces more than three or four lateral surfaces. Also, in addition to the holding portion 4d provided with the electric magnet as described above, a holding portion for holding components may be provided with a clamping device or a suction device or may include a plurality of holding portions. If the holding portion is formed by the plurality of holding portions, the holding portion can appropriately and effectively hold various kinds of components and plurality of components.

The setting device 6 is configured to support the side frames 2a, the connecting frame 2b, the pan frame 2c, the side frames 3a, the member frame 3b, and the upper frame 3c as the components of the seat frame 1 and move at least some of the components to positions in which the moved components are to be assembled, e.g., in a weldable state. The setting device 6 includes a mounting table 6a on which the components of the seat frame 1 are to be mounted. The mounting table 6a includes right-to-left movement rails 6m, front-to-back movement rails 6h, a first base plate 6i, a rotating base 6j, and a second base plate 6k that are arranged in the stated order from bottom to top such that the front-to-back movement rails 6h are movable in the right to left direction, the first base plate 6i is movable in the front to back direction, and the rotating base 6j is movable in a rotational direction.

Specifically, the right-to-left movement rails 6m are a pair of rails extending in the right to left direction and supporting the front-to-back movement rails 6h in such a way that the front-to-back movement rails 6h mounted on the right-to-left movement rails 6m are slidable in the right to left direction. The front-to-back movable rails 6h are a pair of rails extending in the front to back direction (a direction perpendicular to the extending direction of the right-to-left movement rails 6m) and supporting the first base plate 6i in such a way that the first base plate 6i mounted on the front-to-back movement rails 6h is slidable in the front to back direction. The front-to-back movement rails 6h are configured to be moved by the driving force of a motor (not shown) along the right-to-left movement rails 6m in the right to left direction.

The first base plate 6i is a rectangular flat plate on which the rotating base 6j is mounted. The rotating base 6j is a member configured to rotate the second base plate 6k about a vertical axis with respect to the first base plate 6i. The second base plate 6k is a rectangular flat plate similar to the first base plate 6i and is mounted on the rotating base 6j. Supporting portions 6b, 6c, 6d, conveyor rails 6e, conveyor bases 6f, supporting portions 6g, a back-side supporting member 7, and supporting portions 7a, 7b, 7c that are described below are mounted on the second base plate 6k. The configurations of these portions are described in detail below. The mounting table 6a is configured in this manner; thereby, positions of the components that are to be arranged on the mounting table 6a to form the seat frame 1 are adjustable relative to the setting robot 4 and the welding robot 8.

Mechanisms for allowing movements in linear and rotational directions on the mounting table 6a are merely examples and do not restrict the invention. As such mechanisms, a wide variety of mechanisms may be applied in accordance with various embodiments such as the setting robot 4 or the welding robot 8.

The welding robot 8 functions to perform welding on predetermined locations of the assembled cushion frame 2 and the assembled back frame 3. The welding robot 8 includes a rotating table 8a, a lower rotating portion 8b, and an upper rotating portion 8c. The configurations related to operations of these portions are substantially the same as those of the setting robot 4. The welding robot 8 is different from the setting robot 4 in that a welding head 8d is provided at a distal end of the upper rotating portion 8c.

The controller C is a unit (e.g., processor) configured to control operations of the setting robot 4, the setting device 6, and the welding robot 8. Specifically, the setting robot 4 is controlled by the controller C to pick up the components from the component stand 5 and install the components on the setting device 6. The setting device 6 is controlled by the controller C to support the installed components and move the components such that the components are assembled with one another. The welding robot 8 is controlled by the controller C to perform welding on the assembled components. The procedure of manufacturing the seat frame 1 by the controller C is described below.

Supported State of the Components on the Setting Device 6

Figure 3:
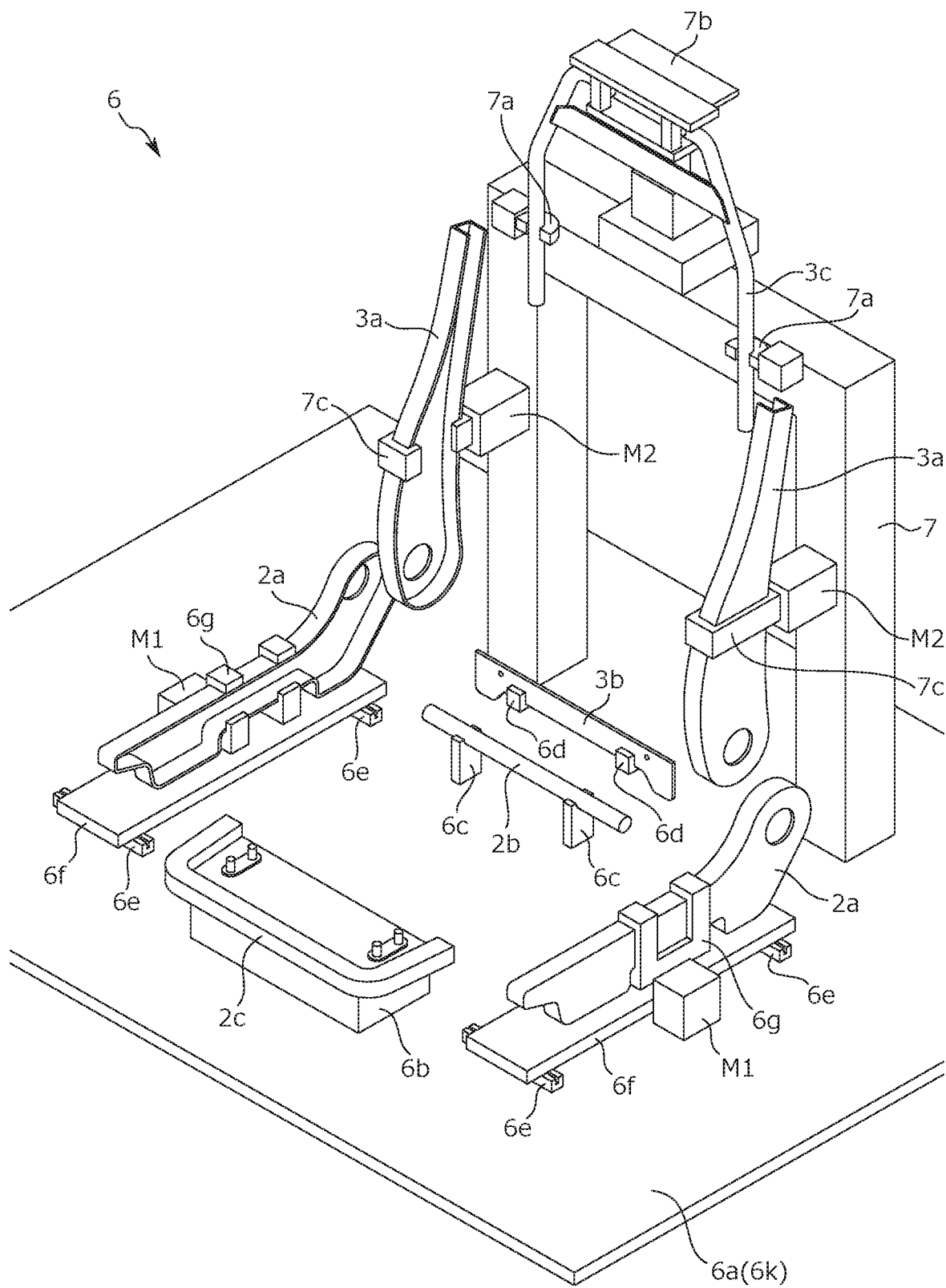
FIG. 3 is a perspective view showing a setting device on which components of a cushion frame and components of a back frame are installed, as viewed from a front-left direction.
Figure 4:
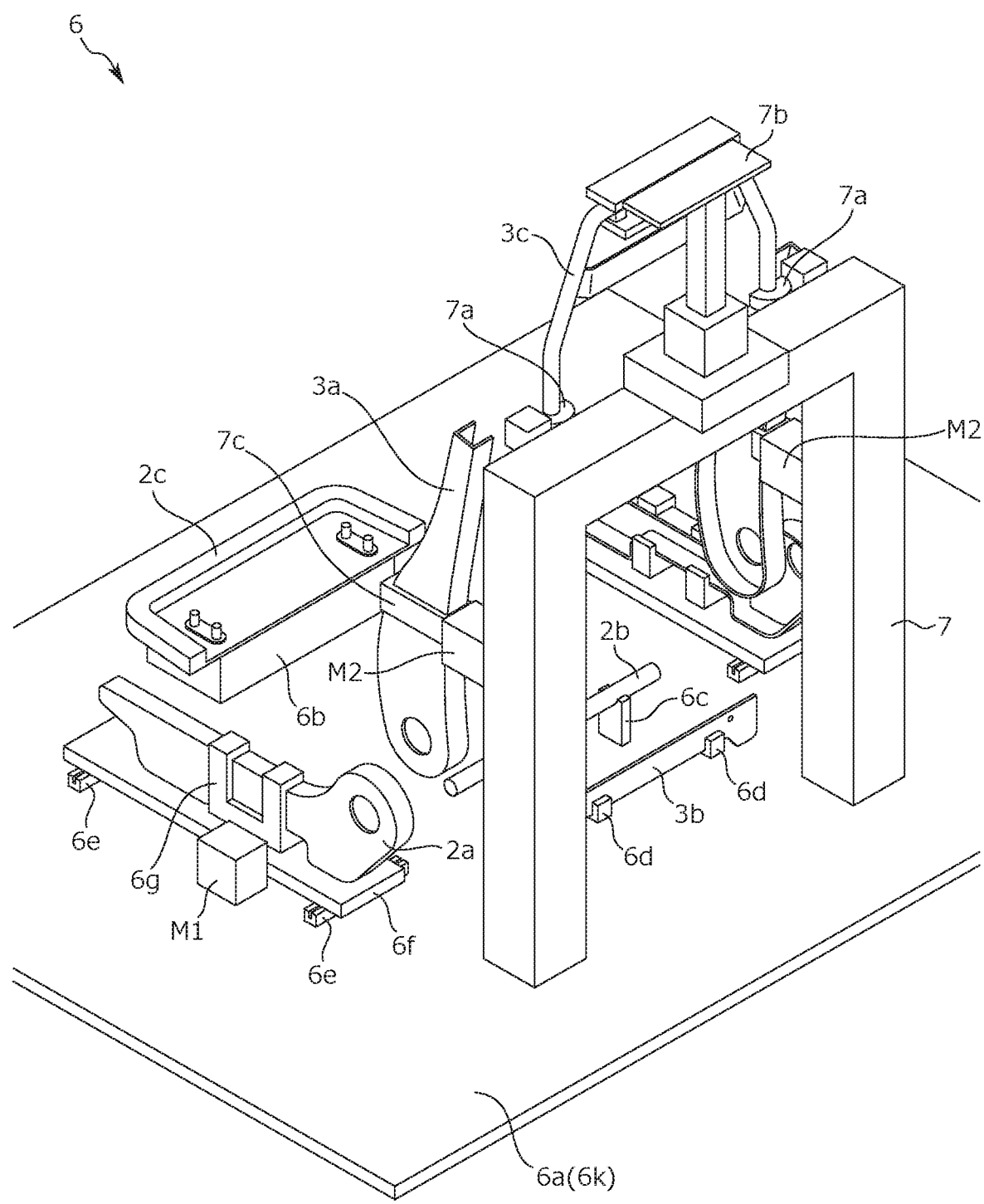
FIG. 4 is a perspective view showing the setting device on which the components of the cushion frame and the components of the back frame are installed, as viewed from a rear-left direction.

The supported state of the components (the side frames 2a, the connecting frame 2b, and the pan frame 2c) of the cushion frame 2 and the supported state of the components (the side frames 3a, the member frame 3b, and the upper frame 3c) of the back frame 3 is described with reference to FIG. 3 and FIG. 4. FIG. 3 is a perspective view showing the setting device 6 on which the components of the cushion frame 2 and the components of the back frame 3 are installed, as viewed from a front-left direction. FIG. 4 is a perspective view showing the setting device 6 on which the components are installed, as viewed from a rear-left direction that is different from the direction shown in FIG. 3.

As described above, the setting device 6 includes the mounting table 6a, and in addition, the supporting portions 6b, 6c, 6d, the conveyor rails 6e, the conveyor bases 6f, the supporting portions 6g, the back-side supporting member 7, and the supporting portions 7a, 7b, 7c that are provided on the second base plate 6k of the mounting table 6a.

The supporting portion 6b (e.g., an inner support portion) supports the pan frame 2c from below in such a manner as to move the pan frame 2c in the right to left direction. Likewise, the supporting portions 6c (e.g., inner support portions) support the connecting frame 2b from below in such a manner as to move the connecting frame 2b in the right to left direction, and the supporting portions 6d (e.g., inner support portions) support the member frame 3b from below in such a manner as to move the member frame 3b in the right to left direction. The supporting portion 6b is formed in a generally cuboid shape elongated in the right to left direction to support the pan frame 2c extending in the right to left direction. Also, a groove with a U-like shape as viewed from the lateral side is formed in each of the supporting portions 6c (e.g., inner support portions) so that the connecting frame 2b can be supported from below by an upper portion of the supporting portion 6c to be movable in the right to left direction. Likewise, each of the supporting portions 6d is formed in a recessed shape as viewed from the lateral side so that the member frame 3b can be supported from below by an upper portion of the supporting portion 6d to be movable in the right to left direction.

Also, each of the conveyor bases 6f is formed in a flat shape extending in the front to back direction. The conveyor base 6f is movably supported in the right to left direction by a pair of front and back conveyor rails 6e. The pair of conveyor rails 6e is located below the conveyor base 6f to extend in the right to left direction. Each side frame 2a is supported by the supporting portion 6g (an outer support portion) located on the conveyor base 6f, and the conveyor base 6f functions to move the side frame 2a inward in the right to left direction, in other words, toward the connecting frame 2b, the member frame 3b, and the pan frame 2c by the driving force of a motor M1. The supporting portion 6g formed in a generally C-like shape as viewed from the front includes: two members arranged at the respective front and back sides and opened inward in the right to left direction; and a member connecting the two members in the front to back direction in such that the two members are joined to each other on the outer side in the right to left direction and on the lower side. The conveyer base 6f, the pair of conveyor rails 6e, the supporting portion 6g, and the motor M1 are provided on each of opposite sides in the right to left direction.

The back-side supporting member 7 is formed in a generally inverted U-like shape as viewed from the front and is fixed to an upper surface of the second base plate 6k of the mounting table 6a. A pair of right and left supporting portions 7a (e.g., inner support portions) functioning to support the upper frame 3c are each formed in a generally U-like shape as viewed from above, and each supporting portion 7a is attached to a front surface on the upper side of the back-side supporting member 7 in such a manner that an opening of the supporting portion 7a faces forward. The supporting portion 7b (e.g., an inner support portion) functions to hold an upper portion of the upper frame 3c in the up to down direction. The upper frame 3c is held by the supporting portion 7b to be clamped by flat plates disposed at the upper and lower side of the upper frame 3c to extend horizontally. A pair of supporting portions 7c (e.g., an outer support portion) functions to support the side frames 3a. The supporting portions 7c are attached in front of a pair of vertically-standing portions of the back-side supporting member 7 via motors M2 provided on respective front surfaces of the vertically-standing portions. The supporting portions 7c are each formed in a C-shape as viewed from above and are attached to the respective motors M2 such that an opening of each supporting portion 7c faces inward in the right to left direction. The supporting portion 7c is movably attached in the right to left direction by the motor M2.

Assembling Method for the Seat Frame 1

Figure 5A:
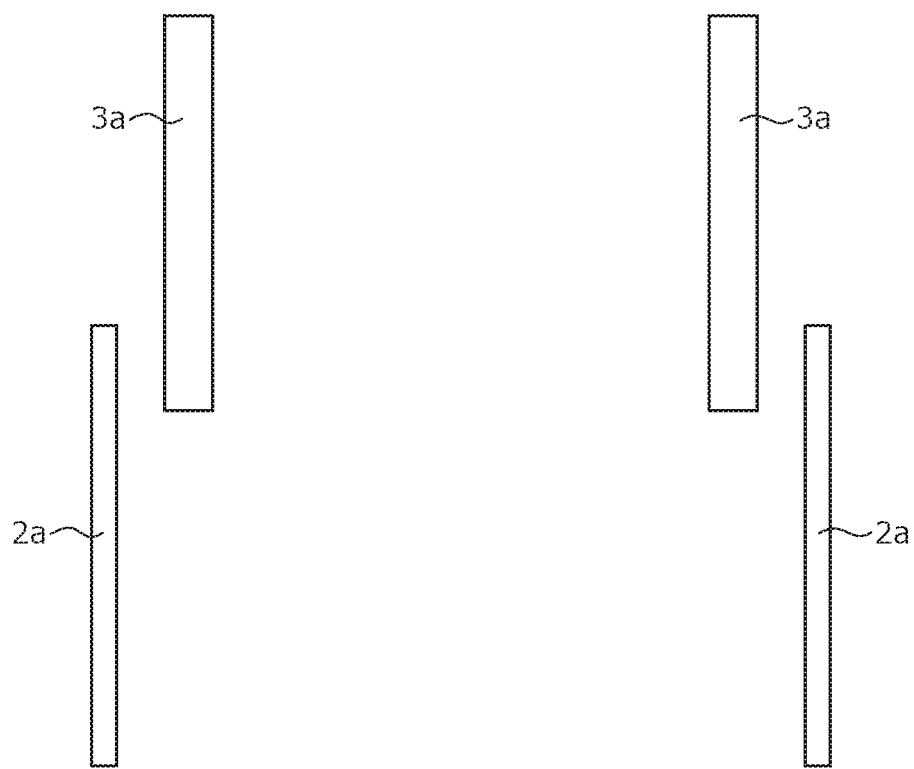
FIG. 5A is a schematic view showing a state where side frames are installed on the setting device.
Figure 5B:
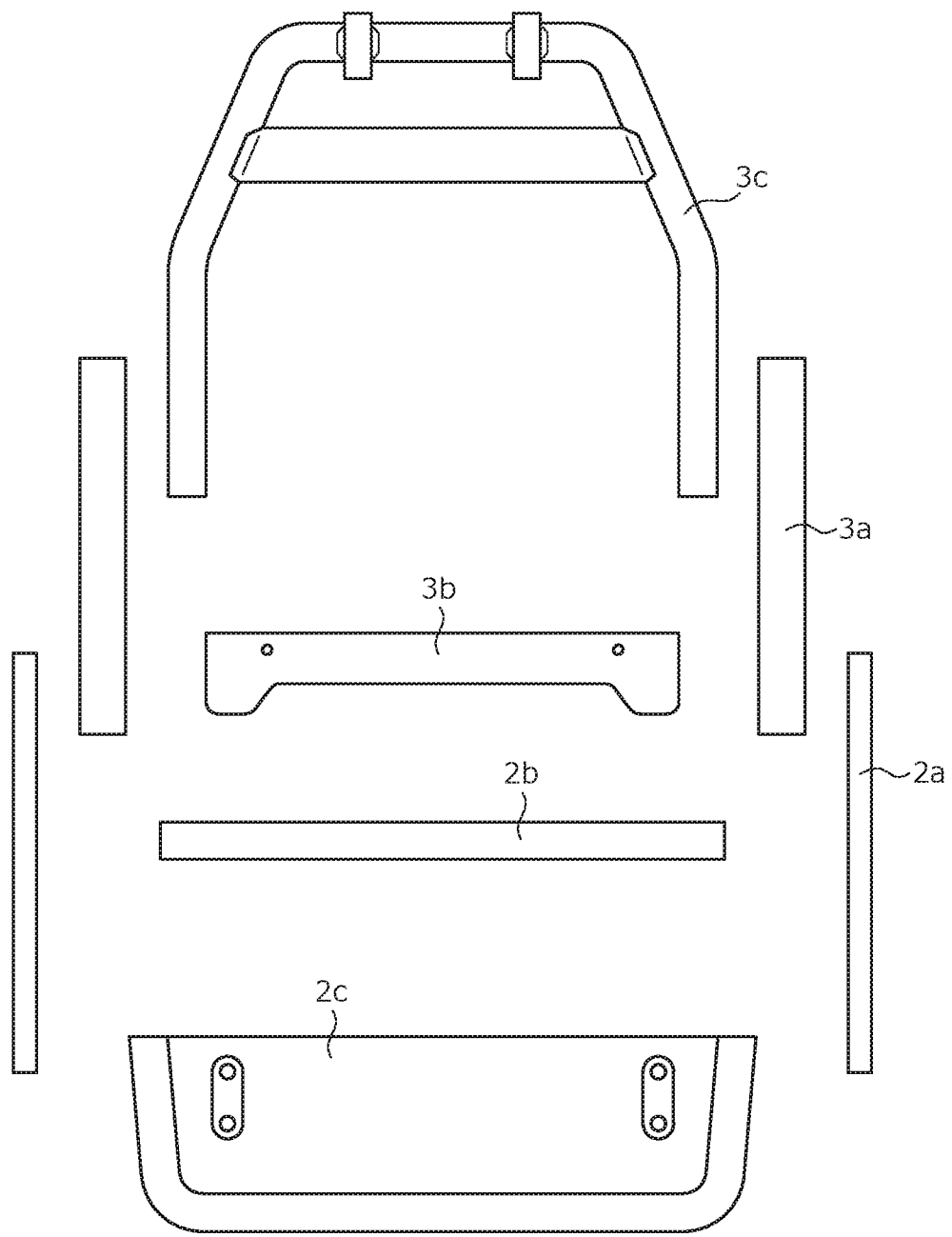
FIG. 5B is a schematic view showing a state where a connecting frame, a pan frame, a member frame, and an upper frame are further installed on the setting device after the state shown in FIG. 5A.
Figure 5C:
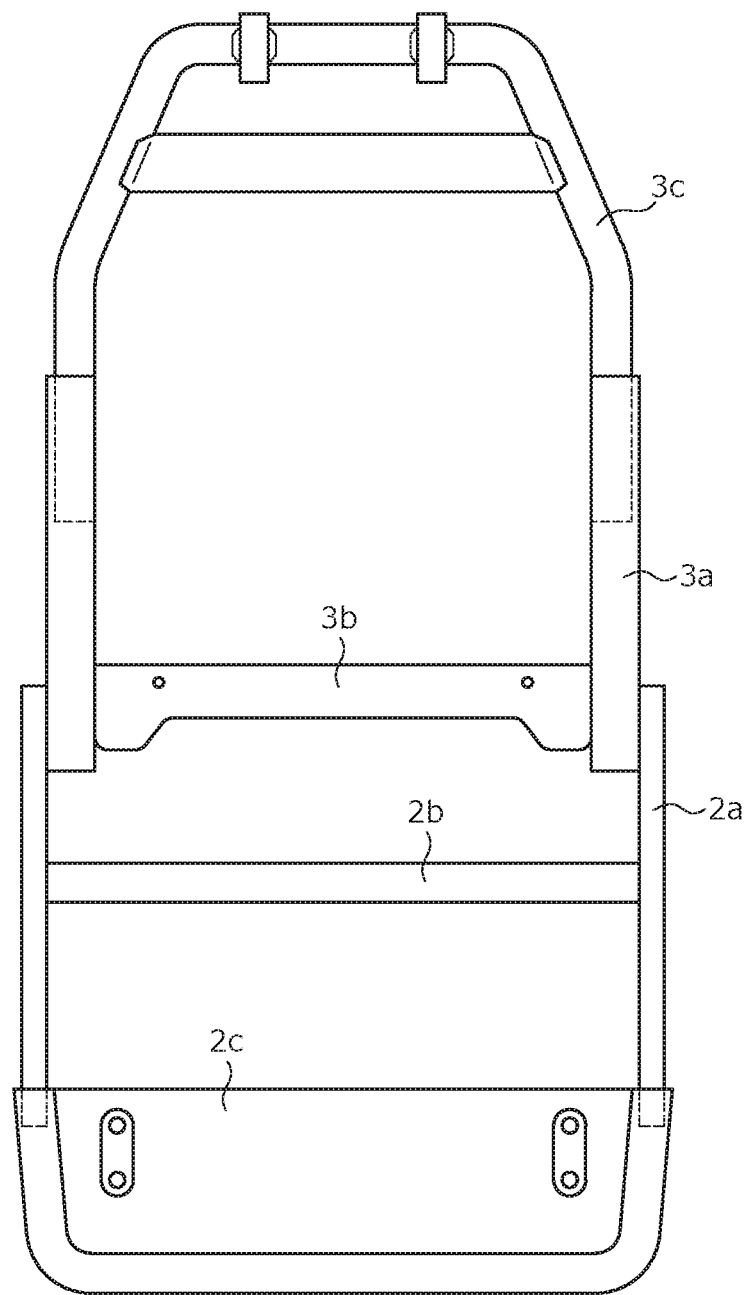
FIG. 5C is a schematic view showing a state where the side frames are moved by the setting device from the state shown in FIG. 5B.
Figure 5D:
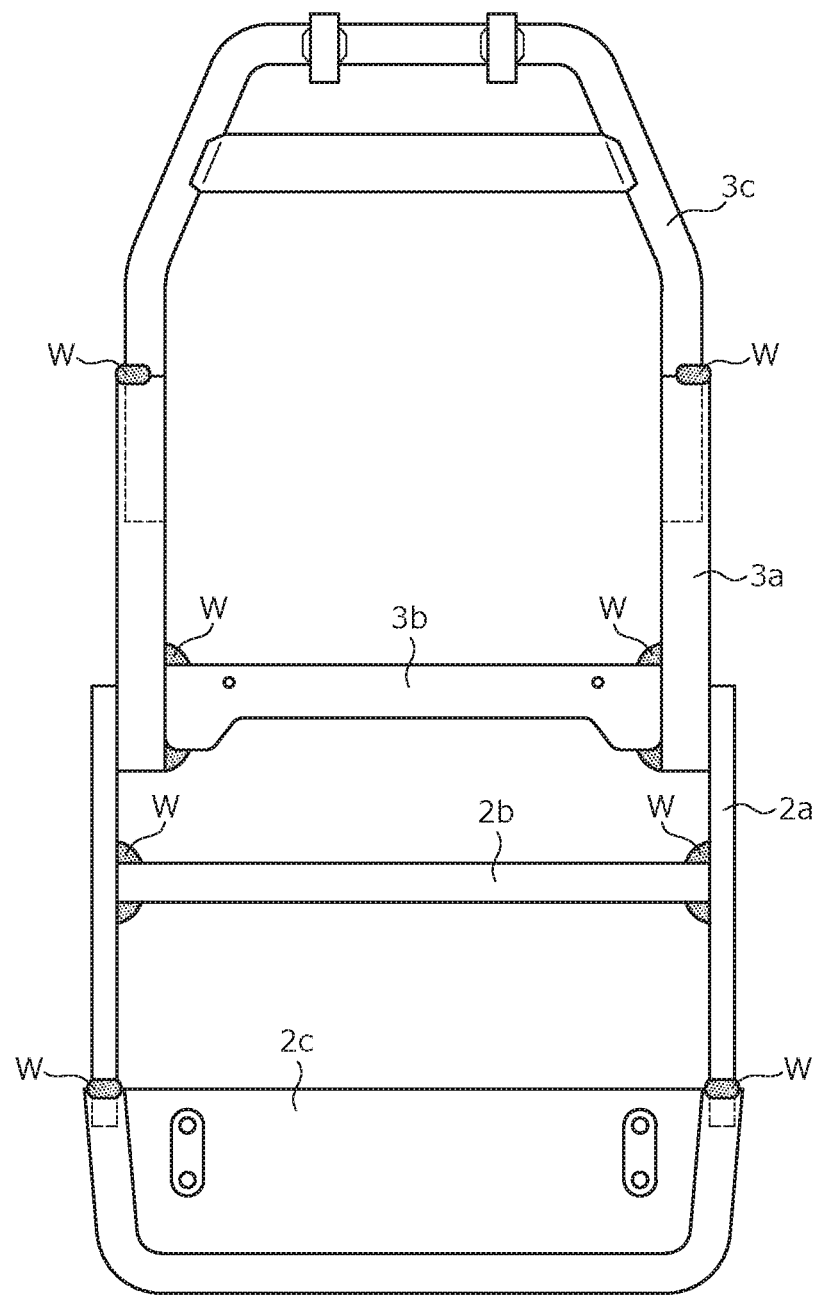
FIG. 5D is a schematic view showing a state where welding is performed on predetermined locations of the components after the state shown in FIG. 5C.

Next, assembling method for the seat frame 1 is described with reference to FIG. 5A, FIG. 5B, FIG. 5C, and FIG. 5D. FIG. 5A is a schematic view showing a state where the side frames 2a, 3a are installed on the setting device 6. FIG. 5B is a schematic view showing a state where the connecting frame 2b, the pan frame 2c, the member frame 3b, and the upper frame 3c are further installed on the setting device 6 after the state shown in FIG. 5A. FIG. 5C is a schematic view showing a state where the side frames 2a, 3a are moved by the setting device 6 from the state shown in FIG. 5B. FIG. 5D is a schematic view showing a state where welding is performed on predetermined locations of the components after the state shown in FIG. 5C.

First, in an installation step, the setting robot 4 is controlled by the controller C to install the side frames 2a, 3a placed on the component stand 5 on the setting device 6 side by side in the right to left direction as schematically shown in FIG. 5A. Specifically, the setting robot 4 allows the holding portion 4d to hold the side frames 2a, 3a by the magnetic force, and the side frames 2a are installed on the setting device 6 to be supported by the respective supporting portions 6g of the setting device 6 and the side frames 3a are installed on the setting device 6 to be supported by the respective supporting portions 7c of the setting device 6.

Thereafter, the setting robot 4 is controlled by the controller C to install the connecting frame 2b, the pan frame 2c, the member frame 3b, and the upper frame 3c placed on the component stand 5 on the setting device 6 such that the frames 2b, 2c, 3b, 3c are positioned between the right and left side frames 2a and between the right and left side frames 3a as schematically shown in FIG. 5B. Specifically, the setting robot 4 allows the holding portion 4d to hold the connecting frame 2b, the pan frame 2c, the member frame 3b, and the upper frame 3c by the magnetic force, and the connecting frame 2b is installed on the setting device 6 to be supported by the supporting portions 6c and the pan frame 2c is installed on the setting device 6 to be supported by the supporting portion 6b. In addition, the member frame 3b is installed on the setting device 6 to be supported by the supporting portions 6d and the upper frame 3c is installed on the setting device 6 to be supported by the supporting portions 7a and the supporting portion 7b.

As described above, the side frames 2a, 3a as the outer frame components of the seat frame 1 are installed on the setting device 6. Afterward, the connecting frame 2b, the pan frame 2c, the member frame 3b, and the upper frame 3c as the inner frame components of the seat frame 1 are installed on the setting device 6. Therefore, an occurrence of defects can be inhibited and thus installation efficiency can be increased. Specifically, the supporting portions 6g, 7c are provided on the setting device 6 in such a manner that their respective openings face inward in the right to left direction. Accordingly, in order to allow the side frames 2a to be supported by the openings of the respective supporting portions 6g and allow the side frames 3a to be supported by the openings of the respective supporting portions 7c, the setting robot 4 conveys the side frames 2a, 3a inward in the right to left direction and are subsequently conveyed outward in the right to left direction to be installed. In such a case, if the connecting frame 2b, the pan frame 2c, the member frame 3b, and the upper frame 3c have been already installed, a precise operation is necessary to prevent the side frames 2a, 3a from interfering with the frames 2b, 2c, 3b, 3c by contacting therewith, in other words, to prevent the side frames 2a, 3a from following a path that overlaps with the frames 2b, 2c, 3b, 3c; therefore, operating efficiency may be decreased.

The pan frame 2c is mounted from above to the supporting portion 6b. The connecting frame 2b and the member frame 3b are mounted from above to the supporting portions 6c and the supporting portions 6d, respectively. The upper frame 3c is mounted from a front side of the back-side supporting member 7 to the supporting portions 7a and the supporting portion 7b. Thus, in mounting the frames 2b, 2c, 3b, 3c, it is not necessary for the back-side supporting member 7 to be moved in the right to left direction. Therefore, according to the aforementioned procedure, in mounting the side frames 2a, 3a on the setting device 6, the side frames 2a, 3a do not interfere with other components. Also, in mounting the connecting frame 2b, the pan frame 2c, the member frame 3b, and the upper frame 3c on the setting device 6, the frames 2b, 2c, 3b, 3c do not interfere with other components mounted in a separate manner from the frames 2b, 2c, 3b, 3c in the right to left direction.

Afterward, in a moving step, the conveyor bases 6f are pushed by the respective motors M1 of the setting device 6 controlled by the controller C. Therefore, the side frames 2a are moved inward in the right to left direction along the conveyor rails 6e. Also, moving loads are applied directly from the respective motors M2 of the setting device 6 controlled by the controller C to the respective supporting portions 7c. Therefore, the side frames 3a are moved inward in the right to left direction. The side frames 2a and the side frames 3a are respectively moved by the motors M1 and the motors M2 to positions in which a load equal to or larger than a predetermined load is applied to the connecting frame 2b, the pan frame 2c, and the member frame 3b, and the upper frame 3c. In other words, the side frames 2a, 3a are moved to positions in which the side frames 2a, 3a are to be assembled with the frames 2b, 2c, 3b, 3c.

For example, the connecting frame 2b, the pan frame 2c, or the member frame 3b is installed in advance in such a manner as to be deviated from a predetermined center in the right to left direction. In this case, when the side frames 2a arranged at the respective right and left sides are moved by the motors M1 toward the center in the right to left direction and the side frames 3a arranged at the respective right and left sides are moved by the motors M2 toward the center in the right to left direction, the connecting frame 2b, the pan frame 2c, the member frame 3b, or the like may be brought into contact with only one of the side frames 2a or only one of the side frames 3a. Since the connecting frame 2b, the pan frame 2c, and the member frame 3b are supported from below by the supporting portions 6c, the supporting portion 6b, and the supporting portions 6d, respectively to be movable in the right to left direction, the connecting frame 2b, the pan frame 2c, or the member frame 3b may be moved toward the center in the right to left direction according to the movement of the side frames 2a, 3a toward the center in the right to left direction.

Accordingly, as shown in FIG. 5, when the right and left side frames 2a, 3a are moved to positions in which the connecting frame 2b, the pan frame 2c, or the member frame 3b is held between the side frames 2a or between the side frames 3a, in other words, when the right and left side frames 2a, 3a are moved to positions in which the side frames 2a, 3a are to be assembled with the frames 2b, 2c, 3b, the connecting frame 2b, the pan frame 2c, or the member frame 3b is moved to the center in the right to left direction. Thus, a position of the connecting frame 2b, the pan frame 2c, or the member frame 3b in the right to left direction is adjusted. When the connecting frame 2b, the pan frame 2c, or the member frame 3b is moved to the center in the right to left direction, a reaction force against the rotating power of the motors M1, M2 is applied and a load equal to or larger than a predetermined load is applied. At this time, the motors M1, M2 are controlled by the controller C to stop.

After the right and left side frames 2a, 3a, the connecting frame 2b, the pan frame 2c, the member frame 3b, and the upper frame 3c are assembled with one another, the welding robot 8 is controlled by the controller C to perform welding on the components; therefore, welding portions W are formed as shown in FIG. 5D. Specifically, the welding robot 8 welds overlapped portions between the right and left side frames 2a and the connecting frame 2b, overlapped portions between the side frames 2a and the pan frame 2c, overlapped portions between the side frames 3a and the member frame 3b, and overlapped portions between the side frames 3a and the upper frame 3c. The setting robot 4, the setting device 6, and the welding robot 8 are used as described above and thereby the cushion frame 2 and the back frame 3 are coupled to each other. Therefore, a portion of manufacturing of the seat frame 1 can be effectively performed. In particular, in a state where the components are supported, welding can be performed on the cushion frame 2 and the back frame 3 in one step. Consequently, welding distortion can be suppressed and dimensional precision can be increased.

In the foregoing embodiment, the cushion frame 2 and the back frame 3 are assembled and manufactured at one time, thus resulting in high manufacturing efficiency. Alternatively, the cushion frame 2 and the back frame 3 may be assembled separately. The foregoing manufacturing method may be applied only to one of the cushion frame 2 and the back frame 3. For example, the components of the cushion frame 2 are first mounted on the mounting table 6a; thereafter, the components of the back frame 3 may be mounted on the back-side supporting member 7.

Specifically, the following procedure may be applied. The side frames 2a that serve as outer members of the cushion frame 2 in the width direction thereof are mounted on the mounting table 6a by the setting robot 4; thereafter, the connecting frame 2b and the pan frame 2c that serve as inner members of the cushion frame 2 in the width direction thereof are mounted on the mounting table 6a by the setting robot 4. Then, the side frames 3a serving as outer members of the back frame 3 in the width direction thereof are installed on the back-side supporting member 7 by the setting robot 4, and the upper frame 3c serving as an inner member of the back frame 3 in the width direction thereof is installed on the back-side supporting member 7 by the setting robot 4. Afterward, the outer members of the side frames 2a in the width direction are moved inward by the respective motors M1 and the outer members of the side frames 3a in the width direction are moved inward by the respective motors M2. The mounting table 6a on which the components of the cushion frame 2 are to be mounted and the back-side supporting member 7 on which the components of the back frame 3 are to be mounted are provided at different positions in the up to down direction. Therefore, if the components are installed in the above-mentioned order, the components may not interfere with one another in the respective mounting operations by the setting robot 4. Consequently, manufacturing efficiency may not be decreased.

The vehicle seat according to the present disclosure may include seats for vehicles, ships, air planes, or industrial machines, and other seats.

Also, in the foregoing embodiment, an installation step of installing the components of the seat frame 1 on the setting device 6 by the setting robot 4, a moving step of moving the components of the seat frame 1 to positions in which the components are to be assembled by the setting device 6, and a welding step of performing welding on the seat frame 1 by the welding robot 8 may be performed in different locations. Furthermore, the motor M1 or the motor M2 for generating the driving force to move the side frame 2a or the supporting portion 7c in the right to left direction is provided as an example in the foregoing embodiment. Alternatively, any device configured to generate a driving force, for example, a drive unit such as an air cylinder, a hydraulic cylinder, or a linear actuator may be applied.

What is claimed is:

1. A seat frame assembling unit comprising:
   a first device configured to be driven in a state where outer frame components of a vehicle seat to be located at an outer side in a seat width direction of the vehicle seat and inner frame components of the vehicle seat to be located at an inner side in the seat width direction are arranged, the outer frame components and the inner frame components being components of at least one of a cushion frame and a back frame that form the vehicle seat; and
   a second device that comprises a holding portion configured to hold the outer frame components and the inner frame components, and an arm to which the holding portion is attached, the second device being configured to convey the outer frame components and the inner frame components onto the first device;

wherein:
   the first device comprises:
      a pair of outer support portions configured to support the outer frame components; and
      an inner support portion configured to support the inner frame components, and arranged between the pair of outer support portions and on an inward side of each of the pair of outer support portions in a width direction of the first device; and
   wherein each of the outer support portions has a C-shape, an inner side of the C-shape in the width direction of the first device is opened, and the inner side of the C-shape contacts a corresponding outer frame component during assembly;
   each of the pair of outer support portions is configured to be movable inward in the width direction of the first device and toward the inner support portion.

2. The seat frame assembling unit according to claim 1, further comprising a welding device configured to perform welding on the cushion frame or the back frame, wherein the welding device comprises a welding head configured to perform welding between i) the outer frame components that are movable by the first device, and ii) the inner frame components.

3. The seat frame assembling unit according to claim 1, wherein:
   the holding portion includes a plurality of surfaces on which the outer frame components and the inner frame components are able to be held.

4. The seat frame assembling unit according to claim 3, wherein:
   an electric magnet is embedded in the holding portion; and
   the plurality of surfaces of the holding portion are configured to hold the outer frame components and the inner frame components by a magnetic force of the holding portion.

5. The seat frame assembling unit according to claim 1, wherein the holding portion is configured to hold a plurality of components of the outer frame components and the inner frame components.

6. The seat frame assembling unit according to claim 1, wherein the first device comprises:
   a mounting table; and
   a back-side supporting member that has an inverted U-shape which vertically stands on a surface of the mounting table, and comprises a support portion configured to support the components of the back frame.

* * * * *